Feb. 8, 1927.
W. E. CARY ET AL
1,617,235
STEAM COOKER
Filed July 6, 1926
2 Sheets-Sheet 2
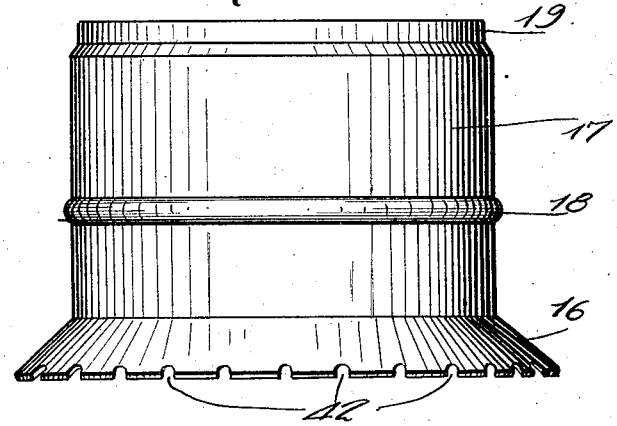
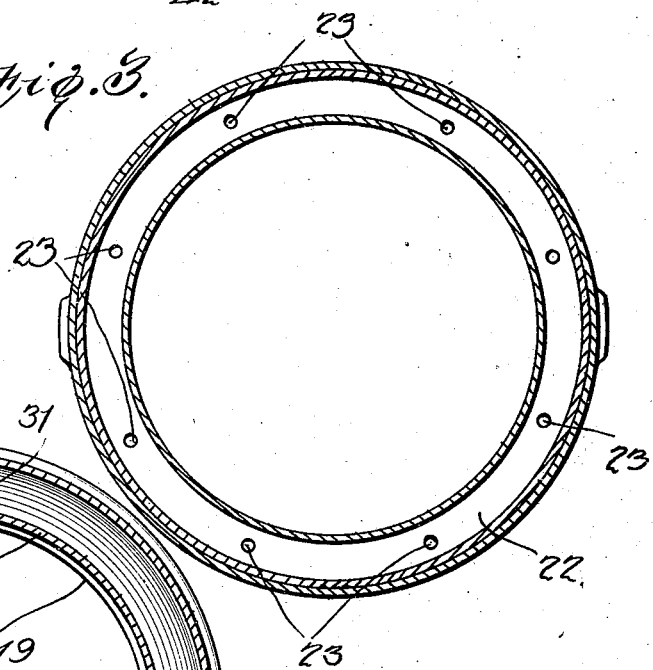
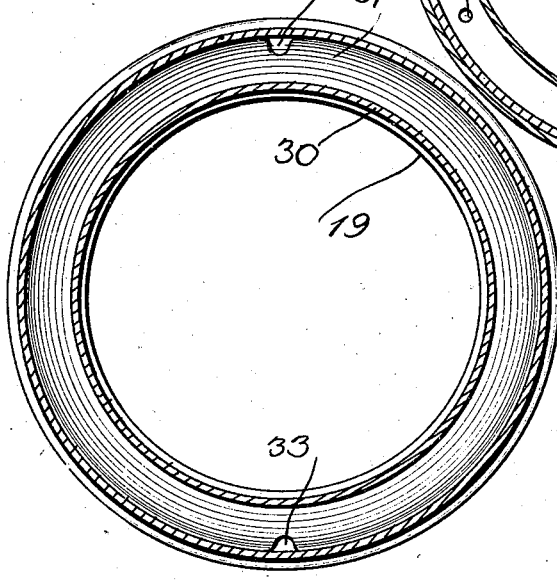
Inventor
W. E. Cary
W. J. Miller.
L. N. Cullis
Attorney Patented Feb. 8, 1927.

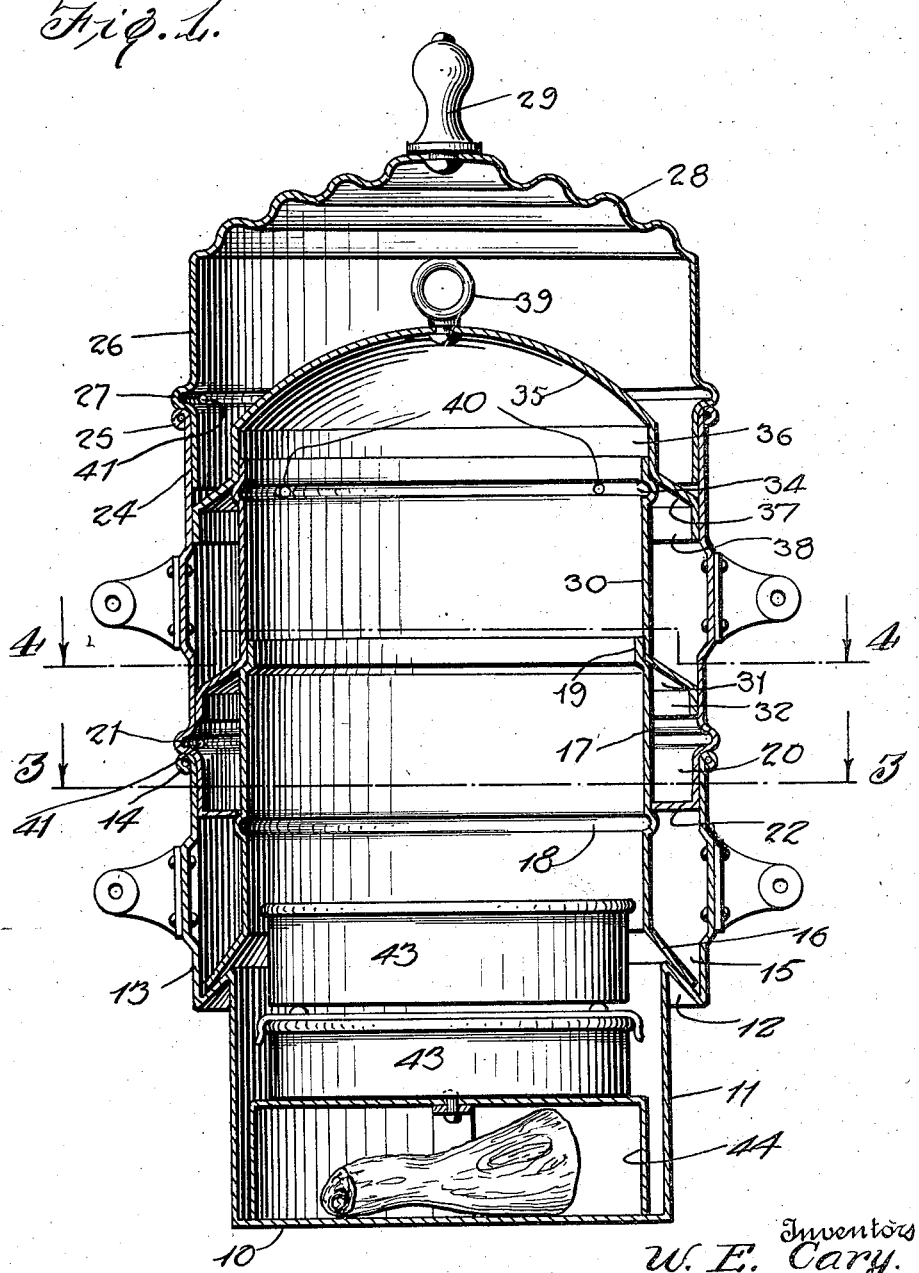

1,617,235

UNITED STATES PATENT OFFICE.

WILLIAM E. CARY AND WILLIAM J. MILLER, OF SULPHUR, LOUISIANA; SAID MILLER ASSIGNOR TO SAID CARY.

STEAM COOKER.

Application filed July 6, 1926. Serial No. 120,795.

This invention relates to culinary utensils and has special reference to a steam cooker.

One object of the invention is to improve the general construction of devices of this character.

A second object of the invention is to provide an improved and novel form of sectional or built up cooker of this class.

A third object of the invention is to provide novel means for condensing the steam used in such a cooker and returning it to the bottom of the cooker.

A fourth object of the invention is to provide an improved form of cooker wherein the condensate will be returned to the bottom of the cooker in such manner that the flavor of one article being cooked will not affect the remaining articles in the cooker.

A fifth object of the invention is to provide a novel form of trap between the steam generating and condensing chambers of such a cooker.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a vertical diametrical section through a steam cooker constructed in accordance with this invention.

Figure 2 is a side elevation of the lower or main steam chamber removed from the remainder of the cooker.

Figure 3 is a section on the line 3—3 of Figure 1.

Figure 4 is a section on the line 4—4 of Figure 1.

In the embodiment of the cooker as shown in the accompanying drawings there is provided a bottom or base member having a bottom 10 preferably of circular form and from the periphery of this bottom a wall 11 extends upwardly. At the top edge of this wall there is provided a downwardly and outwardly extending flange 12; from the outer or bottom edge of the flange a wall 13 extends upwardly and terminates in an external bead 14 at its top edge. Thus the bottom member has a lower part and an upper part of greater diameter than the lower part and connected thereto by a flanged portion forming a trough 15.

Seated in this trough is the outwardly flaring lower end 16 of a cylindrical main steam receptacle having a main cylindrical portion 17 provided intermediate its ends with an outwardly projecting bead 18, the top end of this steam receptacle is constricted to form a cylindrical neck 19.

Fitted in the upper end of the bottom member is the lower end 20 of the upper outer member of the cooker and immediately above this portion 20 the member is provided with an external bead 21 which rests on the bead 14. At the bottom of the portion 20 is an internal flange 22 provided with a series of condensate ports or openings 23 and this flange rests on the bead 18. Above the bead 21 this member extends upwardly as at 24 to terminate in an external bead 25.

Fitted in the upper part of the portion 24 is the lower part of the cylindrical side wall 26 of an external cap or closure and this side wall is provided with an external bead 27 which engages the bead 25. The top 28 of this cap is provided with annular corrugations and is equipped with a handle knob 29.

The intermediate steam casing is provided with a cylindrical wall 30 the lower end of which fits on the neck 19 and is held from slipping down by the flange formed by such neck. At its lower end this part of the cooker is provided with a downwardly and outwardly extending flange 31 having a peripheral skirt 32 which fits against the wall 24 and is provided with condensate escape grooves 33. Adjacent its upper end this member is provided with an external bead 34.

The inner cap is provided with a dome shaped top 35 from the periphery of which depends a cylindrical side wall 36 which fits over the top end of the wall 30 and rests on the flange 34. From the bottom of the wall 36 extends an outwardly and downwardly extending flange 37 having a peripheral skirt 38 provided with condensate grooves like the grooves 33. The top is also provided with a handle ring 39 and steam escape ports 40 are provided in the flange 34.

Air openings 41 are provided in the beads 21 and 27 and condensate escape notches 42 are provided in the bottom edge of the flange 16. A plurality of food pans 43 may be supported on racks 44 above the bottom 10. A roast or the like may be positioned below the bottom pan. Handles 45 are attached to the outer sections, the sections being pressed out at the points of attachment to home the rivet heads by which the handles are attached.

In operation the steam generated in the bottom receptacle, rises in the inner vessels and passes through the ports 40 to the space between the upper ends of the inner and outer vessels where it is condensed. It then passes down through the condensate grooves and collects in the trough. There it passes through the notches 42 and overflows into the bottom vessel where it may be reconverted into steam. The process of condensation is aided by air entering the openings.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a steam cooker a normally closed outer vessel, an inner vessel spaced from the outer vessel and normally closed at its top, said outer vessel having an internal trough forming a condensate trap and the lower end of the inner vessel being seated in said trough, said inner vessel having vertically spaced outwardly and downwardly extending flanges terminating in skirts engaging the inner side of the outer vessel.

2. In a steam cooker a normally closed outer vessel, an inner vessel spaced from the outer vessel and normally closed at its top, said outer vessel having an internal trough forming a condensate trap and the lower end of the inner vessel being seated in said trough and provided with condensate escape notches in its lower edge, said inner vessel having vertically spaced outwardly and downwardly exending flanges terminating in skirts engaging the inner side of the outer vessel.

3. In a steam cooker a normally closed outer vessel, an inner vessel spaced from the outer vessel and normally closed at its top, said outer vessel having an internal trough forming a condensate trap and the lower end of the inner vessel being seated in said trough, said inner vessel having vertically spaced outwardly and downwardly extending flanges terminating in skirts engaging the inner side of the outer vessel, said flanges and skirts having condensate escape grooves formed therein.

4. In a steam cooker a normally closed outer vessel, an inner vessel spaced from the outer vessel and normally closed at its top, said outer vessel having an internal trough forming a condensate trap and the lower end of the inner vessel being seated in said trough and provided with condensate escape notches in its lower edge, said inner vessel having vertically spaced outwardly and downwardly extending flanges terminating in skirts engaging the inner side of the outer vessel, said flanges and skirts having condensate escape grooves formed therein.

5. In a steam cooker a normally closed outer vessel, an inner vessel spaced from the outer vessel and normally closed at its top, said outer vessel having an internal trough forming a condensate trap and the lower end of the inner vessel being seated in said trough, said inner vessel having vertically spaced outwardly and downwardly extending flanges terminating in skirts engaging the inner side of the outer vessel, said flanges and skirts having condensate escape grooves formed therein, said outer vessel having an internal flange below the lowermost flange of the inner vessel engaging the exterior of said inner vessel and provided with condensate ports.

6. In a steam cooker a normally closed outer vessel, an inner vessel spaced from the outer vessel and normally closed at its top, said outer vessel having an internal trough forming a condensate trap and the lower end of the inner vessel being seated in said trough and provided with condensate escape notches in its lower edge, said inner vessel having vertically spaced outwardly and downwardly extending flanges terminating in skirts engaging the inner side of the outer vessel, said flanges and skirts having condensate escape grooves formed therein, said outer vessel having an internal flange below the lowermost flange of the inner vessel engaging the exterior of said inner vessel and provided with condensate ports.

In testimony whereof we affix our signatures.

WILLIAM E. CARY.
WILLIAM J. MILLER.